(12) United States Patent
Fabre et al.

(10) Patent No.: US 10,632,691 B2
(45) Date of Patent: Apr. 28, 2020

(54) INSTALLATION AND A METHOD FOR SHAPING AN AXISYMMETRIC FIBER PREFORM PRESENTING A PROFILE THAT VARIES IN RADIAL SECTION

(71) Applicant: SAFRAN AIRCRAFT ENGINES, Paris (FR)

(72) Inventors: Hubert Jean Marie Fabre, Melun (FR); Jérémy Hellot, La Celle Saint Cloud (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/325,901

(22) PCT Filed: Aug. 7, 2017

(86) PCT No.: PCT/FR2017/052205
§ 371 (c)(1),
(2) Date: Feb. 15, 2019

(87) PCT Pub. No.: WO2018/033672
PCT Pub. Date: Feb. 22, 2018

(65) Prior Publication Data
US 2019/0210302 A1    Jul. 11, 2019

(30) Foreign Application Priority Data

Aug. 16, 2016   (FR) ...................... 16 57767

(51) Int. Cl.
*B29C 70/32* (2006.01)
*B29B 11/16* (2006.01)
*B29L 23/00* (2006.01)

(52) U.S. Cl.
CPC .............. *B29C 70/32* (2013.01); *B29B 11/16* (2013.01); *B29L 2023/00* (2013.01)

(58) Field of Classification Search
CPC ..... B29C 53/56; B29C 70/326; B29C 53/562; B32B 38/1825; B32B 38/1866;
(Continued)

(56) References Cited

U.S. PATENT DOCUMENTS 3,788,638 A * 1/1974 Lehmann ............. B65H 3/0638
                                                    271/272
4,750,965 A * 6/1988 Pippel ................... B29C 70/388
                                                    156/361
(Continued)

FOREIGN PATENT DOCUMENTS

| DE | 10 2013 210034 A1 | 12/2014 |
|----|-------------------|---------|
| WO | WO 2006/136755 A2 | 12/2006 |
| WO | WO 2014/174193 A1 | 10/2014 |

OTHER PUBLICATIONS

International Preliminary Report on Patentability and the Written Opinion of the International Searching Authority as issued in International Patent Application No. PCT/FR2017/052205, dated Feb. 19, 2019.
(Continued)

*Primary Examiner* — Matthew J Daniels
(74) *Attorney, Agent, or Firm* — Pillsbury Winthrop Shaw Pittman LLP

(57) ABSTRACT

An installation for shaping an axisymmetric fiber preform presenting a profile that varies in radial section, includes a storage mandrel for storing a fiber texture in the form of a wound strip, one or more follower rollers, and an axisymmetric mold, the storage mandrel, each follower roller, and the mold presenting across their axial widths radii that vary defining outside surfaces having respective profiles in relief, at least one follower roller including a plurality of roller segments, each extending over a fraction of the axial width of the follower roller, each roller segment including a platen defining a portion of the outside surface of the follower
(Continued)

roller; and an actuator system suitable for moving the platen of the roller segment in a direction that is radial relative to the axis of the follower roller.

8 Claims, 6 Drawing Sheets

(58) Field of Classification Search
CPC .............. B32B 38/1875; B65H 23/025; B65H 23/063; B65H 23/0253; B65H 23/0255
See application file for complete search history.

(56) References Cited

U.S. PATENT DOCUMENTS

2005/0104441 A1* 5/2005 Bertelson .............. B29C 70/345
301/64.703
2013/0221568 A1* 8/2013 Shindo .................. B29C 43/222
264/258

OTHER PUBLICATIONS

International Search Report as issued in International Patent Application No. PCT/FR2017/052205, dated Dec. 21, 2017.

* cited by examiner

INSTALLATION AND A METHOD FOR SHAPING AN AXISYMMETRIC FIBER PREFORM PRESENTING A PROFILE THAT VARIES IN RADIAL SECTION

CROSS REFERENCE TO RELATED APPLICATIONS

This application is the U.S. National Stage of PCT/FR2017/052205, filed Aug. 7, 2017, which in turn claims priority to French Patent Application No. 1657767 filed Aug. 16, 2016, the entire contents of all applications are incorporated herein by reference in their entireties.

BACKGROUND OF THE INVENTION

The present invention relates to shaping fiber preforms by winding a fiber texture that has been obtained by three-dimensional (3D) or multilayer weaving. Such fiber preforms constitute fiber reinforcing structures for composite material parts.

The invention relates more particularly to fiber preforms that are to form the reinforcement of axisymmetric composite material parts that present a profile in section that varies (varies in shape and/or thickness), such as for example an aeroengine fan casing. The fiber preform for such a part is made by weaving a fiber texture and winding that texture under tension onto an axisymmetric mold including a winding surface of radial section that includes a portion in relief corresponding to the profile of the part that is to be fabricated.

In order to make a fiber texture that is adapted to the varying shape of the injection mold, use is made of shape weaving, also referred to as "contour weaving" or "outline weaving", which consists in taking up different lengths of warp yarns as a function of their position across the width of the fiber texture that is being woven in the form of a strip, so as to obtain ratios between the warp yarn lengths (tangential direction) that are similar to the ratios between the radii defining the varying profile of the final part that is to be fabricated.

The fiber texture as woven in that way is stored on a storage mandrel for subsequent winding under tension onto an axisymmetric injection mold that includes a winding surface having in radial section a profile in relief that corresponds to the profile of the part to be fabricated. While the texture is being wound onto the mold, it is put under tension by the storage mandrel, which is also referred to as the "takeup" mandrel, with one or more follower rollers being placed between the storage mandrel and the injection mold. The follower roller(s) present(s) radii that vary across their axial width so as to define an outside surface or profile in relief that serves, between the storage mandrel and the injection mold, to conserve the yarn length ratios as defined during weaving. Conserving yarn length ratios thus serves to maintain uniform tension in the fiber texture.

While the fiber preform is being shaped on the mold, the fiber texture is rolled up through a plurality of turns. For each turn the ratio between the various radii defining the profile in relief changes as a function of the layers of fiber texture that have already been wound. These changes in profile are themselves greater when the shape and/or thickness ratios in the final part are large.

While the fiber texture is being wound onto the injection mold, it can become offset because of the differences between the woven profile and the real profile onto which it is being wound, thereby leading to losses of tension at certain axial positions across the texture. These unbalanced tensions across the width of the part can lead to defects such as waves, fibers buckling, fibers being pinched, zones of unwanted extra thickness, and out-of-specification fiber volume fractions. These tension unbalances can also complicate the shaping of the fiber texture by winding by giving rise in particular to the formation of creases or of misalignments, thereby causing the shaping of the fiber texture to be more arduous and to take longer.

OBJECT AND SUMMARY OF THE INVENTION

The invention seeks to provide a solution to the above-mentioned drawbacks.

To this end, the invention provides an installation for shaping an axisymmetric fiber preform presenting a profile that varies in radial section, the installation comprising a storage mandrel for storing a fiber texture in the form of a wound strip, one or more follower rollers, and an axisymmetric mold onto which the fiber texture is to be shaped by being wound, the follower rollers being placed between the storage mandrel and the axisymmetric mold, the storage mandrel, each follower roller, and the mold presenting across their axial widths radii that vary so as to define outside surfaces having respective profiles in relief, at least one follower roller comprising a plurality of roller segments, each extending over a fraction of the axial width of the follower roller, each roller segment comprising:

- a platen defining a portion of the outside surface of the follower roller; and
- an actuator system suitable for moving the platen of said roller segment in a direction that is radial relative to the axis of the follower roller in order to modify locally the profile of the outside surface of the follower roller.

By using roller segments that make it possible to modify locally the profile in relief of the outside surface of one or more follower rollers while winding the fiber texture under tension onto the mold, the installation of the invention makes it possible to shape fiber preforms of profile that varies in radial section and in which losses or non-uniformities of tension are significantly reduced. Furthermore, the roller segments of the invention may also be used for increasing tension locally in the fiber texture, e.g. in order to reduce the preform expanding in a thicker zone (in order to avoid pinching and buckling).

These effects may be the result of the texture being wound onto the mold in order to be shaped or they may appear while closing the mold if the tension exerted on the texture was poorly applied, and they then become visible in the injected part. Advantageously, while being wound onto the mold, the fiber preform presents few defects (waves in the first turn to be wound, tension poorly applied giving rise to buckling and/or pinching of fibers while closing the mold, zones of undesired extra thickness, fiber volume fractions out of specification, creases, misalignments, etc.) compared with a fiber preform made in accordance with the prior art in which tension unbalances are greater. This serves to reduce unwanted stops of the winding machine as are usually necessary in order to correct defects such as creases or portions of the texture collapsing, which also require the machine to be reversed together with action to be taken by one or more technicians. Advantageously, such an installation also makes it possible to fabricate distinct fiber preforms that present similar profiles while using the same follower roller, i.e. without it being necessary to replace the follower roller, as is necessary in the prior art.

According to a first particular characteristic of the installation of the invention, a flexible membrane covers each roller segment platen of said at least one follower roller.

According to a second particular characteristic of the installation of the invention, each roller segment of at least one follower roller is associated with a sensor suitable for measuring the tension of the fiber texture, each sensor being connected to a servo-control system configured to respond to the tension measurements of the sensors in order to control the actuator system(s) of some or all of the roller segments.

According to a third particular characteristic of the installation of the invention, each roller segment has a distinct rotary shaft, the platen of the roller segments being secured to the rotary shaft, the actuator system being configured to move the rotary shaft of said roller segment radially.

According to a fourth particular characteristic of the installation of the invention, said at least one follower roller has a rotary shaft common to the roller segments, each platen of a roller segment being connected to the rotary shaft by at least one elastically deformable element, the actuator system having a plurality of contrarotating elements suitable for applying a radial movement force against each platen of a roller segment.

According to a fifth particular characteristic of the installation of the invention, said at least one elastically deformable element comprises springs or a compressible foam.

According to a sixth particular characteristic of the installation of the invention, said at least one follower roller comprises a stationary support shaft with a plurality of rolling bearings facing each platen of a roller segment, each platen being connected to the rolling bearings by springs, the actuator system comprising a plurality of contrarotating elements suitable for applying a radial movement force against each platen of a roller segment.

The invention also provides a method of shaping from a fiber texture obtained by three-dimensional or multilayer weaving to form an axisymmetric fiber preform presenting a profile that varies in radial section, the fiber texture being shaped by being wound under tension onto an axisymmetric mold in order to obtain the fiber preform, the fiber texture being unwound from a storage mandrel, the fiber texture traveling over one or more follower rollers placed between the storage mandrel and the axisymmetric mold, the storage mandrel, each follower roller, and the mold presenting across their axial widths radii that vary in such a manner as to define an outside surface having a profile in relief, at least one follower roller comprising a plurality of roller segments each extending over a fraction of the axial width of the follower roller, each roller segment comprising a platen defining a portion of the outside surface of said at least one follower roller, each platen being movable in a radial direction relative to the axis of said at least one follower roller, and, while winding the fiber texture onto the axisymmetric mold, the method further comprising a step of moving at least one platen of a roller segment from among the plurality of roller segments in a radial direction relative to the axis of said at least one follower roller.

According to a particular characteristic of the method of the invention, the method comprises:
  a step of measuring a tension acting on a fiber texture being unwound from the storage mandrel and traveling over a follower roller; and
  in response to the tension measurement, a step of causing the platen of at least one roller segment to move radially.

BRIEF DESCRIPTION OF THE DRAWINGS

Other characteristics and advantages of the invention appear from the following description of particular embodiments of the invention given as non-limiting examples, and with reference to the accompanying drawings, in which.

DETAILED DESCRIPTION OF EMBODIMENTS

Figure 2:
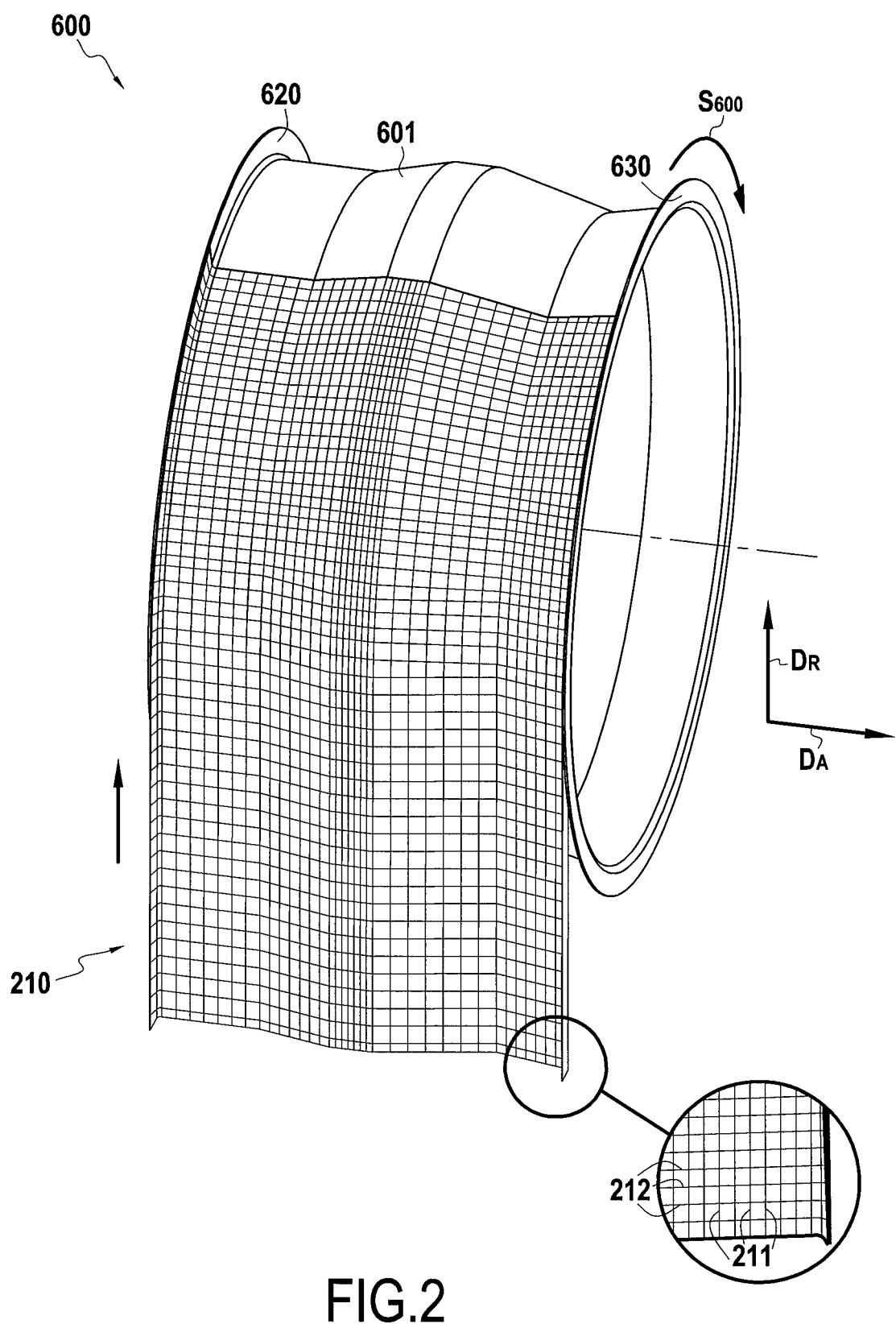
FIG. 2 is a diagrammatic perspective view showing a fiber texture being wound onto an injection mold of the FIG. 1 installation.

The invention applies in general manner to making axisymmetric follower roller preforms that present, in radial section, a profile that varies and that are suitable for constituting fiber reinforcement, which preforms are for use in fabricating axisymmetric parts made of composite material likewise presenting a profile that varies and/or a thickness that varies, in particular in radial section. A radial section corresponds to a plane defined by the axial direction and the radial direction of the mold on which the preform is shaped. The axial direction DA and the radial direction DR are shown in FIG. 2. The parts are obtained by winding a fiber texture onto a mold, injecting a fluid composition, such as a resin, into the fiber preform as constituted in this way, and then subjecting said composition to heat treatment in order to obtain the matrix.

Figure 1:
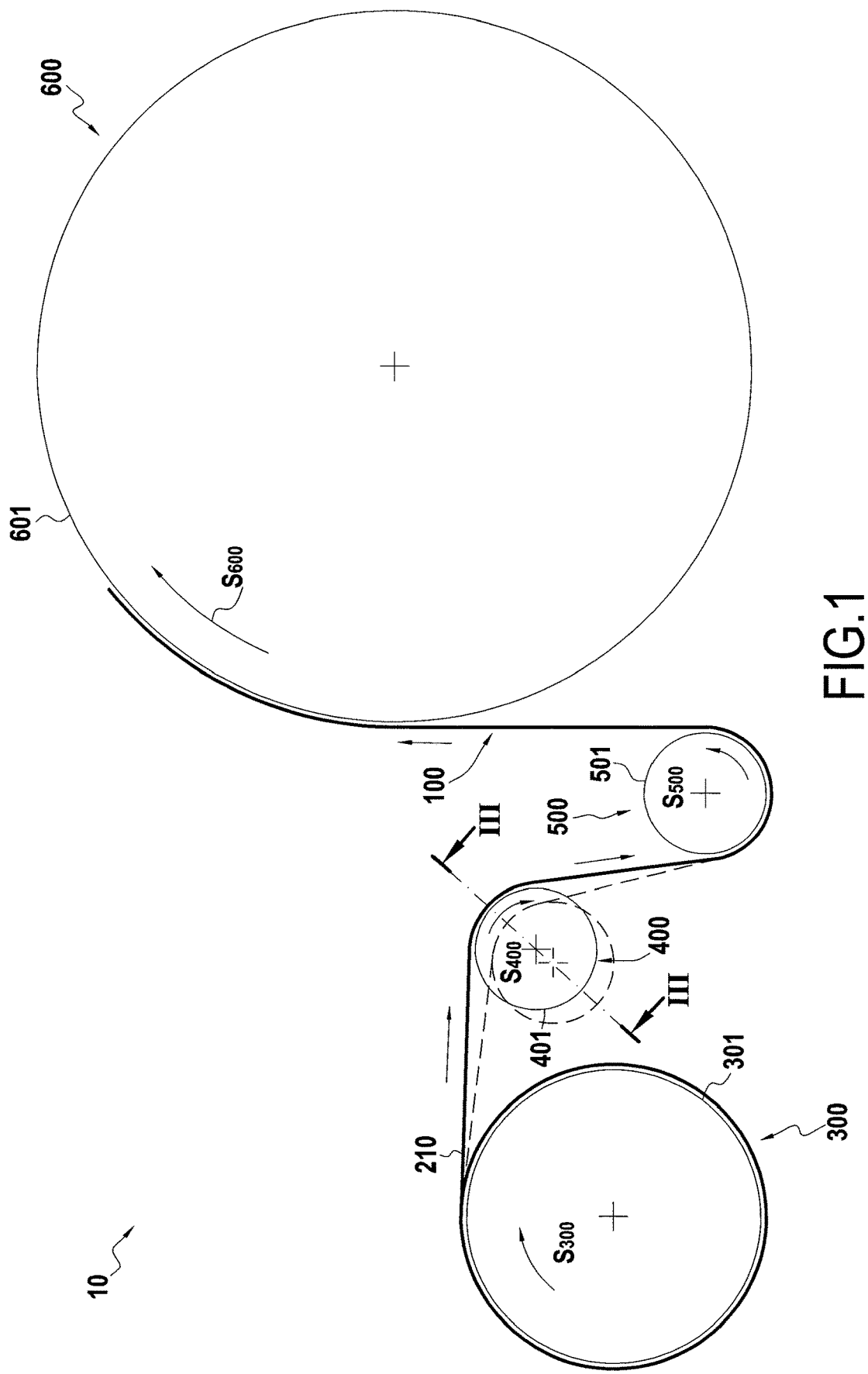
FIG. 1 is a diagrammatic view of an installation for shaping a fiber texture of varying shape in accordance with an embodiment of the invention.

FIG. 1 shows an installation 10 for shaping a fiber preform of varying shape in accordance with an embodiment of the invention. The installation 10 comprises a storage mandrel 300, two follower rollers 400 and 500 placed downstream from the mandrel 300 in the travel direction of the fiber texture, and a mold 600 arranged downstream from the follower roller 500. A fiber texture 210 present on the storage mandrel 300 is unwound therefrom so as to be shaped by being wound onto the mold 600, with winding taking place under tension that is controlled at the storage mandrel.

The fiber structure 210 is obtained by three-dimensional weaving or by multilayer weaving performed in known manner using a Jacquard type loom having arranged thereon a bundle of warp yarns or strands occupying a plurality of layers. The warp yarns are interlinked by weft yarns in the resulting structure.

The term "three-dimensional weaving" or "3D weaving" is used herein to mean a weaving technique in which at least some of the weft yarns interlink the warp yarns over a plurality of warp layers, or vice versa. The 3D weaving may be of the interlock type, as described in Document WO 2006/136755.

The term "multilayer weaving" is used herein for 3D weaving using a plurality of warp layers in which the base weave of each layer is equivalent to a conventional 2D weave, such as a plain, satin, or twill type weave, but with certain points of the weave that interlink warp layers, or vice versa.

Making the fiber structure by 3D or multilayer weaving makes it possible to obtain bonding between the layers, and thus to have good mechanical strength for the fiber structure and for the composite material part obtained therefrom, while using a single textile operation.

In particular, the fiber structure may be woven from yarns made of carbon fibers, of ceramic fibers such as silicon carbide fibers, of glass fibers, or indeed of aramid fibers.

In order to make a fiber texture that is adapted to the varying shape of the fiber preform that is to be shaped on the injection mold, use is made of shape weaving, also known as "contour weaving", that consists in delivering different lengths of warp yarns as a function of their positions across the width of the fiber texture being woven in the form of a strip. For this purpose, one or more delivery rollers are used at the outlet of the loom that present varying radii across the axial width so as to define an outside surface having a profile in relief that makes it possible to deliver different lengths of warp yarn as a function of the positions of the yarns across the width of the fiber texture, with a greater length of warp yarn being delivered by a portion of a delivery roller that has a radius that is greater than the remainder of the roller.

The differential delivery performed by the delivery rollers has repercussions in the weaving cell of the loom by pulling the proper lengths of warp yarns prior to inserting the following column of weft yarns. The texture as woven in this way is wound onto a mandrel or storage drum that is also referred to as a "takeup" mandrel, and that is situated downstream from the takeup rollers. The fiber texture is thus stored in this way for subsequent shaping on a mold.

As shown in FIG. 2, the fiber preform is shaped by winding the fiber texture 210 onto an injection mold 600. The fiber texture 210 is made by three-dimensional or multilayer weaving between a plurality of warp yarns 211 and a plurality of weft yarns 212. The fiber texture 210 forms a strip presenting in cross-section a profile that varies, i.e. a shape that varies and/or a thickness that varies in cross-section. The mold presents a profile in radial section that corresponds to the profile of the part to be made, which in the presently-described example corresponds to an aeroengine fan casing.

To this end, the mold 600 presents an outside surface 601 of profile in relief that corresponds to the inside surface of the casing that is to be made. By being wound onto the mold 600, the fiber texture 210 matches the shape of its profile. The mold 600 also has two cheek plates 620 and 630 for forming portions of the fiber preform that correspond to the flanges of the casing that is to be made. The mold 600 is driven in rotation in the direction of rotation $S_{600}$, e.g. by an electric motor (not shown in FIG. 2), while the fiber texture 210 is put under tension between the storage mandrel 300 and the mold 600.

The first and second follower rollers 400 and 500 placed downstream from the storage mandrel 300 are driven by the fiber texture 210 in respective directions of rotation $S_{400}$ and $S_{500}$ shown in FIG. 1. Across their axial width, they present a radius that varies so as to define respective outside surfaces 401 and 501 of profiles in relief that correspond to the profile intended for the fiber preform that is to be made.

The installation 10 also has a storage mandrel or drum 300, also referred to as the "takeup" mandrel, which is driven in rotation mainly in the direction of rotation $S_{300}$ and which also presents across its axial width a radius that varies so as to define an outside surface 301 that has a profile in relief corresponding to the profile intended for the fiber preform so as to limit deformation of the fiber texture 210 while it is being stored. Since the storage mandrel 300 serves to put the fiber texture under tension while it is being wound, it can happen that its rotation is momentarily stopped or reversed relative to the direction of rotation $S_{300}$ in order to maintain tension on the texture while it is being wound on the injection mold.

In accordance with the invention, at least one follower roller 400, 500 has a plurality of roller segments, each extending over a portion of its axial width. Each roller segment comprises a platen specific thereto and thus defines a portion of the outside surface of the follower roller 400, 500. Each roller segment thus presents an axial width that is less than the axial width of the follower roller 400, 500.

In addition, each roller segment includes an actuator system suitable for moving its platen in a radial direction relative to the axis of the follower roller 400, 500, thus enabling the profile of the outside surface of the follower roller 400, 500 to be modified locally.

Each platen can thus be moved independently so as to control variation in the radius of the follower roller 400, 500 locally across its axial width.

The number of roller segments for a follower roller 400, 500 may in particular be determined as a function of the geometrical complexity of the part to be made. By way of example, it is possible to use one roller segment per weaving zone, generally corresponding to one specific thickness. Weaving zones that comprise specific weaves and/or types of strand can present behaviors that are different, thereby requiring different tensions to be applied independently to the fiber texture 210.

Figure 3A:
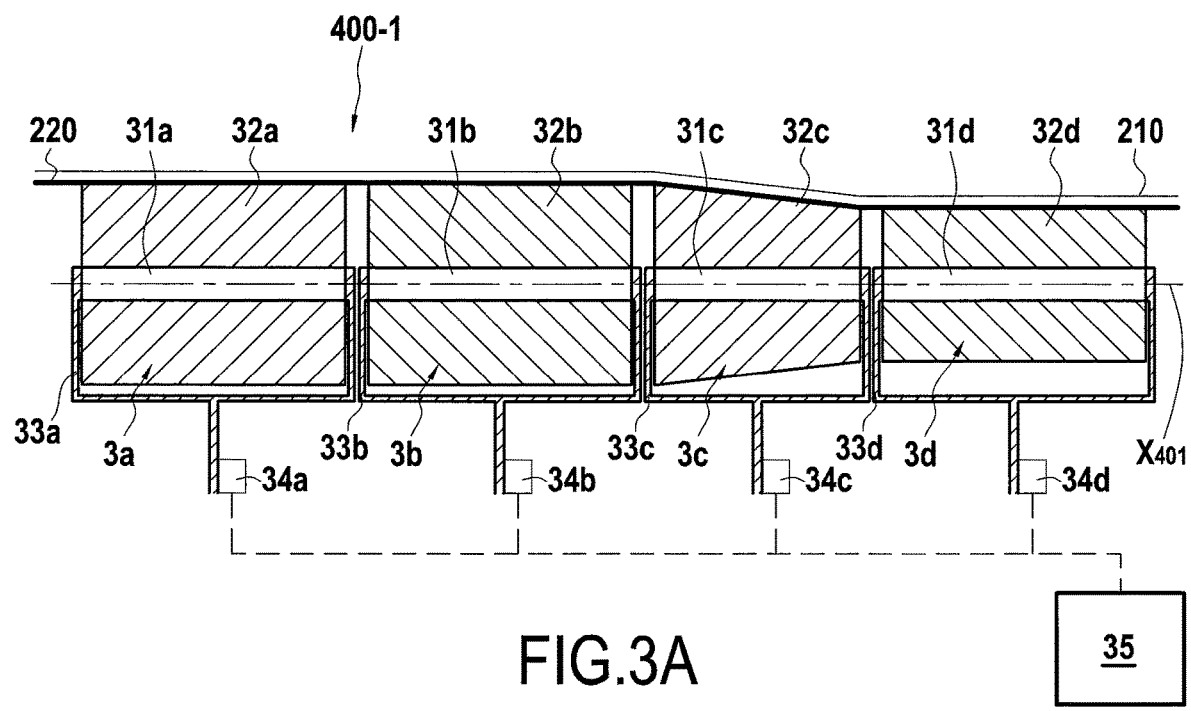
FIGS. 3A and 3B are diagrammatic axial section views of a follower roller on plane III of FIG. 1 in an embodiment.
Figure 3B:
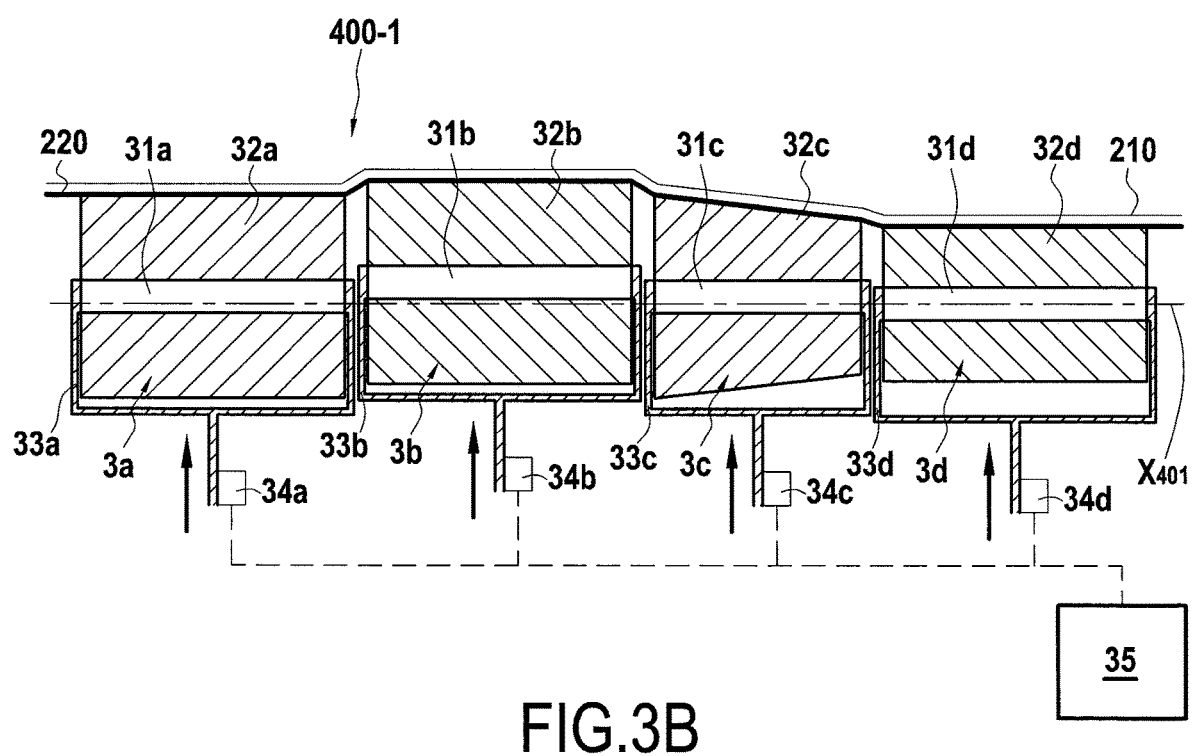

FIGS. 3A and 3B show a first embodiment of a follower roller 400-1 that, by way of example, is the follower roller 400 of FIG. 1, seen in section on plane III.

The follower roller 400-1 is made up of four roller segments 3a, 3b, 3c, 3d, where this number is selected herein for illustrative purposes. Each roller segment has a distinct rotary shaft 31a, 31b, 31c, 31d, and the platen 32a, 32b, 32c, 32d of each of these roller segments is secured to its rotary shaft. Each roller segment 3a, 3b, 3c, 3d also includes an actuator system suitable for moving its rotary shaft radially, thereby likewise moving the platen 32a, 32b, 32c, 32d secured to the rotary shaft radially. Each roller segment 3a, 3b, 3c, 3d can be moved radially independently of the radial movement of the other roller segment.

In the example shown, each actuator system of each roller segment 3a, 3b, 3c, 3d includes in particular arms 33a, 33b, 33c, 33d that are arranged at opposite ends of each rotary shaft 31a, 31b, 31c, 31d and that are connected thereto. Movement means for moving the 33a, 33b, 33c, 33d and represented by vertical across in FIG. 3B, e.g. actuators, then serve to move the arms 33a, 33b, 33c, 33d radially and thus to move each platen 32a, 32b, 32c, 32d of each roller segment 3a, 3b, 3c, 3d radially.

Controlling the movements of each platen 32a, 32b, 32c, 32d then makes it possible for the tensioning of the fiber texture 210 traveling over the follower roller to be controlled locally across the axial width of the follower roller.

By way of example, FIG. 3A shows an initial situation in which the fiber texture 210 is unwound from the storage mandrel, travels over both follower rollers 400 and 500, including the follower roller 400-1, and is then wound onto the mold 600.

In this initial situation, it is assumed that winding a first turn does not lead to the fiber texture 210 being offset on the mold 600. The tension exerted on the fiber texture 210 by the follower roller 400-1 is then assumed to be appropriate.

Consequently, none of the roller segments 3a, 3b, 3c, 3d is moved and their rotary shafts 31a, 31b, 31c, 31d are all in alignment on a common axis $X_{401}$.

Thereafter, FIG. 3B shows a situation that is consecutive with the initial situation and that requires the tension exerted by the follower roller 400-1 on the fiber texture 210 to be adapted locally, e.g. in order to limit any risk of the fiber texture 210 being offset while it is being wound onto the mold 600. In this situation, offsetting constitutes one of the indicators concerning the quality with which tension in the fiber texture 210 is distributed, which has an influence on the quality of the part that is produced, and in particular on its fiber fraction. Certain other indicators may be taken into account while adapting the tension applied to the fiber texture 210, e.g. expansion which influences waves, pinching, and buckling of fibers.

As can be seen in the figure, some of the platens of the roller segments are then moved radially and independently of one another relative to the axis $X_{401}$. The tension exerted on the fiber texture 210 by the follower roller 400-1 is then controlled locally across the axial width of the follower roller 400-1.

The way the tension exerted on the fiber texture 210 by a follower roller 400 is varied in this embodiment is shown in FIG. 1. As can be seen in this figure, moving at least one roller segment between a first position, drawn in dashed lines, and a second position, drawn in continuous lines, serves to adapt the tension exerted by the follower roller 400 on the fiber texture 210.

Furthermore, in this embodiment, it is possible to cover each of the platens 32a, 32b, 32c, 32d of the roller segments 3a, 3b, 3c, 3d with a flexible membrane 220 in order to support the fiber texture 210 traveling over the follower roller. Such support may be particularly advantageous if the presence of the arms 33a, 33b, 33c, 33d between the roller segments 3a, 3b, 3c, 3d leads to there being gaps between them that are relatively large. The flexible membrane is thus deformable so as to be capable of following the radial movements of the roller segments 3a, 3b, 3c, 3d.

FIGS. 4A to 5B show another embodiment of a follower roller 400-2 that, by way of example, is the follower roller 400 of FIG. 1, seen in section plane III.

The follower roller 400-2 is made up of four roller segments 4a, 4b, 4c, 4d, this number likewise being selected for illustrative purposes.

A rotary shaft of axis $X_{402}$ is common to all of the roller segments 4a, 4b, 4c, 4d. Each platen 42a, 42b, 42c, 42d of each of the roller segments 4a, 4b, 4c, 4d is connected to a rotary shaft of axis $X_{402}$ by springs 43. Unlike the first-described embodiment, each platen 42a, 42b, 42c, 42d is thus movable relative to the rotary shaft of axis $X_{402}$.

In another embodiment that is not shown, each of the roller segments 4a, 4b, 4c, 4d is connected to the rotary shaft of axis $X_{402}$ by a slideway system replacing the springs 43.

Furthermore, each roller segment 4a, 4b, 4c, 4d includes an actuator system suitable for moving each platen 42a, 42b, 42c, 42c radially and in independent manner. In this example, each actuator system is in the form of a contrarotating element 44a, 44b, 44c, 44d, such as a backing roller in the example shown, suitable for applying a radial movement force against a respective roller segment platen. By way of example, the contrarotating elements 44a, 44b, 44c, 44d may be moved radially by arms connected both to their rotary shafts and to movement means, symbolized by vertical arrows in FIG. 4b, e.g. actuators.

Figure 4A:
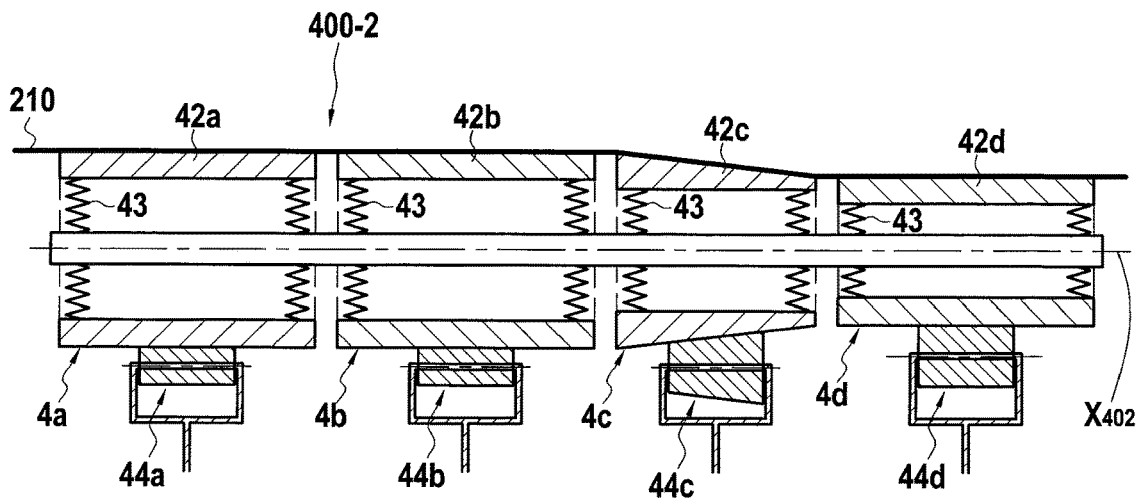
FIGS. 4A and 4B are diagrammatic axial section views of a follower roller on plane III of FIG. 1 in another embodiment.

FIG. 4A shows an initial situation similar to that of FIG. 3A: the fiber texture 210 is unwound from the storage mandrel, travels over the follower rollers, including the follower roller 400-2, and is then wound onto the mold 600. In this situation, it is assumed that a first winding turn does not lead to the fiber texture 210 being offset on the mold 600. The tension exerted on the fiber texture 210 by the follower roller 400-2 is then assumed to be appropriate. Consequently, none of the roller segments 4a, 4b, 4c, 4d is moved, and the springs 43 connecting each platen 42a, 42b, 42c, 42d to the rotary shaft of axis $X_{402}$ are in a first configuration, such as a rest configuration.

Figure 4B:
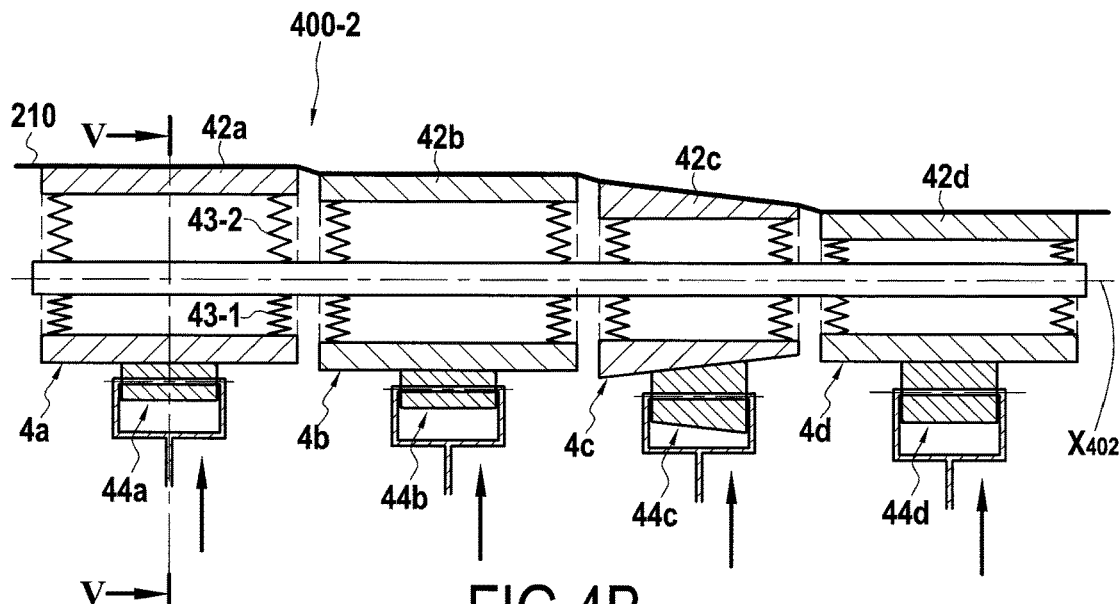

Thereafter, FIG. 4B shows a situation that requires the tension exerted by the follower roller 400-1 on the fiber texture 210 to be adapted, by way of example, in order to limit any risk of the fiber texture 210 being offset while it is being wound onto the mold 600. As can be seen in the figure, some of the platens are then moved radially in independent manner relative to the axis $X_{402}$. More precisely, some of the contrarotating elements 44a, 44b, 44c, 44d exert a movement force against a surface of a facing roller segment 4a, 4b, 4c, 4d. The effect of applying a force on a roller segment 4a, 4b, 4c, 4d is to compress some of the springs 43, such as the spring 43-1, and to stretch other springs, such as the spring 43-2, so as to end up moving the platen 42a, 42b, 42c, 42d.

Figure 5A:
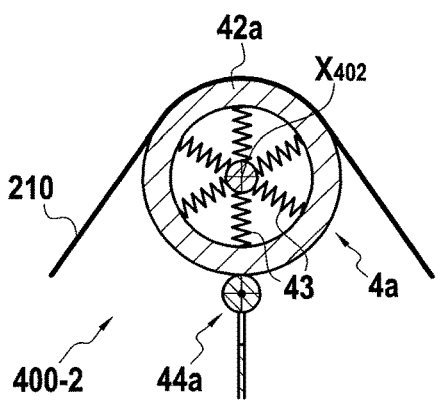
FIGS. 5A and 5B are diagrammatic axial section views of the follower roller of FIGS. 4A and 4B on plane V.
Figure 5B:
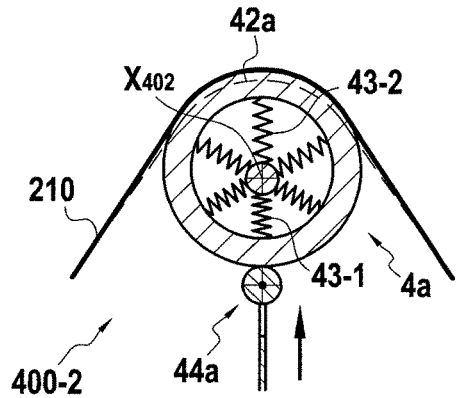

FIGS. 5A and 5B are cross-section views on plane V of FIG. 4B, relating respectively to the situations described in FIGS. 4A and 4B. In these figures, there can be seen in particular the respective shapes of the springs 43 in the first configuration (FIG. 5A) and the compression and stretching of the springs 43 (FIG. 5B).

Furthermore, dashed lines in FIG. 5B show the tension initially exerted on the fiber texture 210 by the follower roller 400-2 in the initial situation of FIG. 5A. As can be seen in FIG. 5B, the movement of at least one roller segment between a first position shown in dashed lines and a second position shown in continuous lines serves to control the tension exerted by the follower roller 400-2 on the fiber texture 210.

FIGS. 6A to 7B then show another embodiment of a follower roller 400-3 that, by way of example, is the follower roller 400 of FIG. 1, seen in section on plane III.

The follower roller 400-3 is made up of four roller segments 6a, 6b, 6c, 6d, this number being selected for illustrative purposes. A rotary shaft of axis $X_{403}$ is common to all of the roller segments 6a, 6b, 6c, 6d. Each platen 62a, 62b, 62c, 62d of each roller segment 6a, 6b, 6c, 6d is connected to the rotary shaft of axis $X_{403}$ by a compressible foam 63. The compressible foam 63 is thus secured to each platen 62a, 62b, 62c, 62d and to the rotary shaft of axis $X_{403}$. In these figures, the different tension states within the compressible foam 63 are symbolized by a varying gray scale. The paler grays on this scale symbolize an expanded shape, while the darker grays symbolize a compressed state of the compressible foam 63.

Furthermore, each roller segment has an actuator system suitable for moving each platen 62a, 62b, 62c, 62d radially and in independent manner. In this example, each actuator system is constituted by a contrarotating element 64a, 64b, 64c, 64d such as a backing roller in the example shown, suitable for applying a radial movement force against a respective roller segment platen. By way of example, the contrarotating elements 64a, 64b, 64c, 64d may be moved radially by means of arms connected both to their rotary shafts and also to movement means, such as for example actuators, symbolized by vertical arrows in FIG. 6B.

Figure 6A:
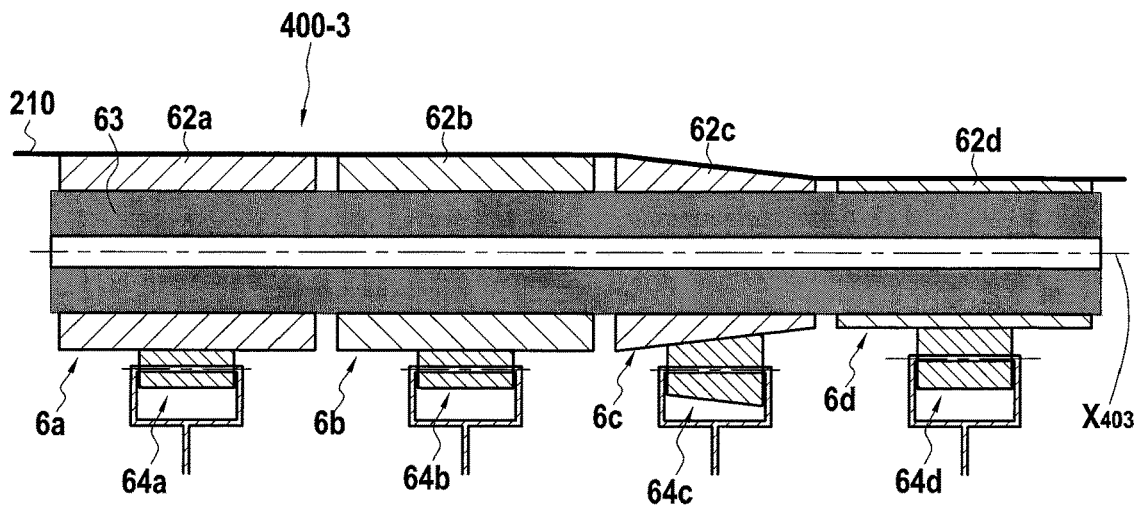
FIGS. 6A and 6B are diagrammatic axial section views of a follower roller on plane III of FIG. 1 in another embodiment.

FIG. 6A shows an initial situation in which the fiber texture 210 is unwound from the storage mandrel, travels over the follower rollers, including the follower roller 400-3, and is then wound onto the mold 600. In this situation, it is assumed that a first winding turn does not lead to the fiber texture 210 being offset on the mold 600. The tension exerted on the fiber texture 210 by the follower roller 400-3 is then assumed to be appropriate. Consequently, none of the roller segments 6a, 6b, 6c, 6d is moved and the compressible foam 63 connecting each platen 62a, 62b, 62c, 62d to the rotary shaft of axis $X_{403}$ is in a first configuration, such as a rest configuration.

Figure 6B:
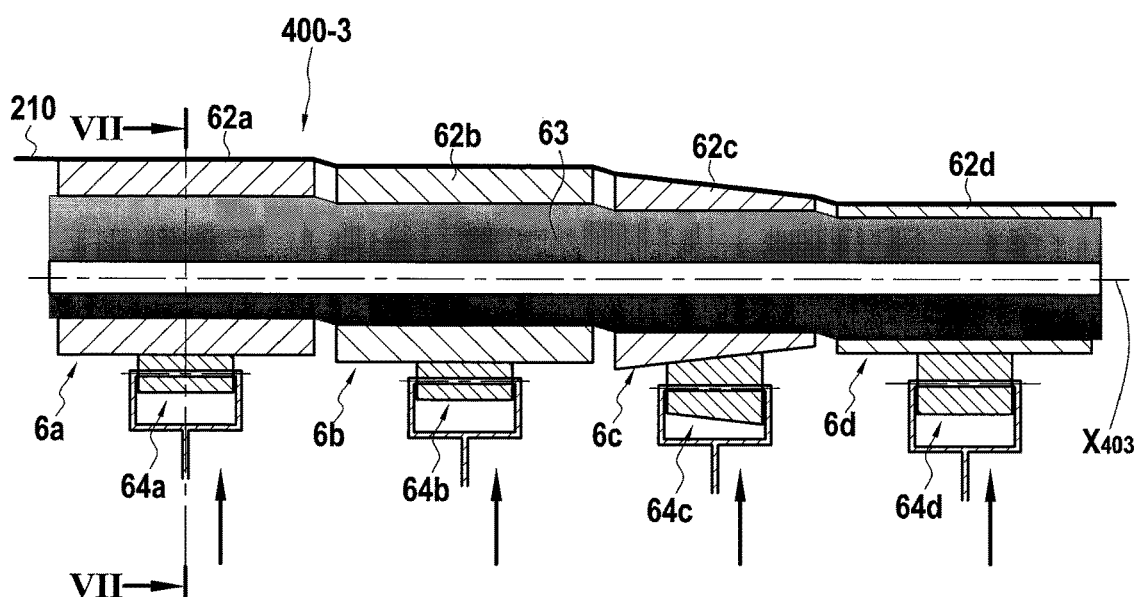

Thereafter, FIG. 6B shows a situation that requires the tension exerted by the follower roller 400-3 on the fiber texture 210 to be adapted, e.g. in order to limit any risk of the fiber texture 210 becoming offset while it is being wound onto the mold 600. As can be seen in this figure, some of the platens 62a, 62b, 62c are then moved radially and in independent manner relative to the axis $X_{403}$. More precisely, some of the contrarotating elements 64a, 64b, 64c, 64d exert a movement force against a surface of a facing roller segment 62a, 62b, 62c, 62d. The effect of applying a force on a roller segment 6a, 6b, 6c, 6d is to compress indirectly the foam in certain zones (darker gray zones), and to expand it in other zones (paler gray zones) so as to end up moving the platen 62a, 62b, 62c, 62d of the corresponding roller segment 6a, 6b, 6c, 6d.

Figure 7A:
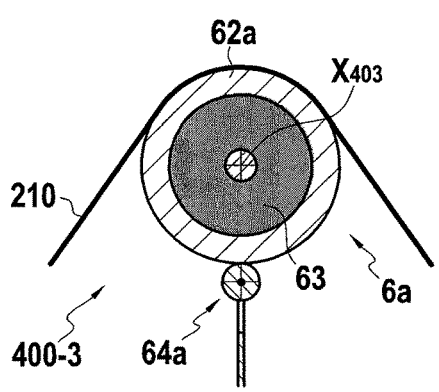
FIGS. 7A and 7B are diagrammatic axial section views of the follower roller of FIGS. 6A and 6B on plane VII.
Figure 7B:
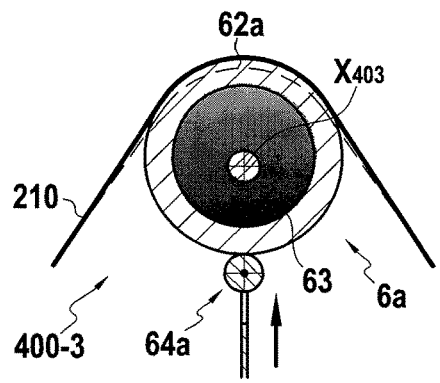

FIGS. 7A and 7B are cross-section views in plane VII of FIG. 6B relating respectively to the situation described for FIGS. 6A and 6B. In particular, in these figures, the state of the compressible foam 63 can be seen in the first configuration (FIG. 7A) and also the compression and expansion zones of the compressible foam 63 (FIG. 7B).

Furthermore, dashed lines in FIG. 7B represent the tension initially exerted on the fiber texture 210 by the follower roller 400-3 in the situation of FIG. 7A. As can be seen in FIG. 7B, moving at least one roller segment between a first position drawn in dashed lines and a second position drawn in continuous lines serves to control the tension exerted by the follower roller 400-3 on the fiber texture 210.

FIGS. 8A to 9B show another embodiment of a follower roller 400-4 that, by way of example, is the follower roller 400 of FIG. 1, seen in section on plane III.

The follower roller 400-4 is made up of four roller segments 8a, 8b, 8c, 8d, this number being selected by way of illustration. A stationary support shaft of axis $X_{404}$ is common to all of the roller segments 8a, 8b, 8c, 8d. The stationary support shaft of axis $X_{404}$ is associated with a plurality of rolling bearings 81 facing each of the platens 82a, 82b, 82c, 82d of a roller segment 8a, 8b, 8c, 8d. Each platen 82a, 82b, 82c, 82d of each of the roller segments 8a, 8b, 8c, 8d is connected to the rolling bearings 81 by springs 83, thus serving to connect the platens to the stationary support shaft of axis $X_{404}$ and allowing them to rotate thereabout.

Furthermore, each roller segment includes an actuator system suitable for moving each platen 82a, 82b, 82c, 82d radially and in independent manner. In this example, each actuator system is constituted by a contrarotating element 84a, 84b, 84c, 84d such as a backing roller in the example shown, suitable for applying a radial movement force against a respective roller segment platen. By way of example, the contrarotating elements 84a, 84b, 84c, 84d may be moved radially by using arms connected to their rotary shafts and also to movement means, e.g. actuators, symbolized by vertical arrows in FIG. 8B.

Figure 8A:
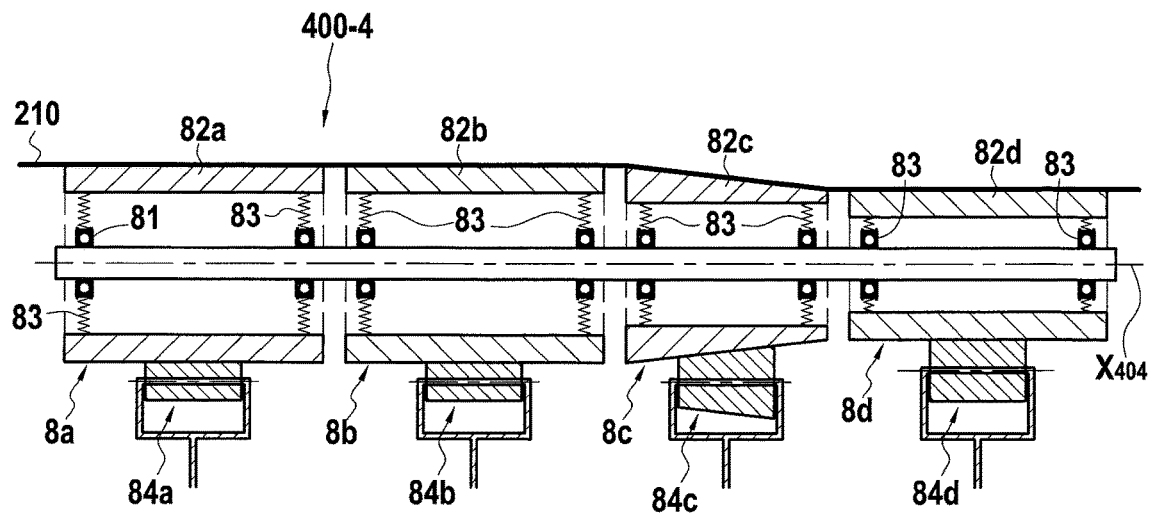
FIGS. 8A and 8B are diagrammatic axial section views of a follower roller on plane III of FIG. 1 in another embodiment.

FIG. 8A shows an initial situation in which the fiber texture 210 is unwound form the storage mandrel, travels over the follower rollers, including the follower roller 400-4, and is then wound onto the mold 600. In this situation, it is assumed that a first winding turn does not lead to the fiber texture 210 being offset on the mold 600. The tension exerted on the fiber texture 210 by the follower roller 400-4 is then assumed to be appropriate. Consequently, none of the roller segments 8a, 8b, 8c, 8d is moved, and the springs 83 connected to the rolling bearings 81 are in a first configuration, such as a rest configuration.

Figure 8B:
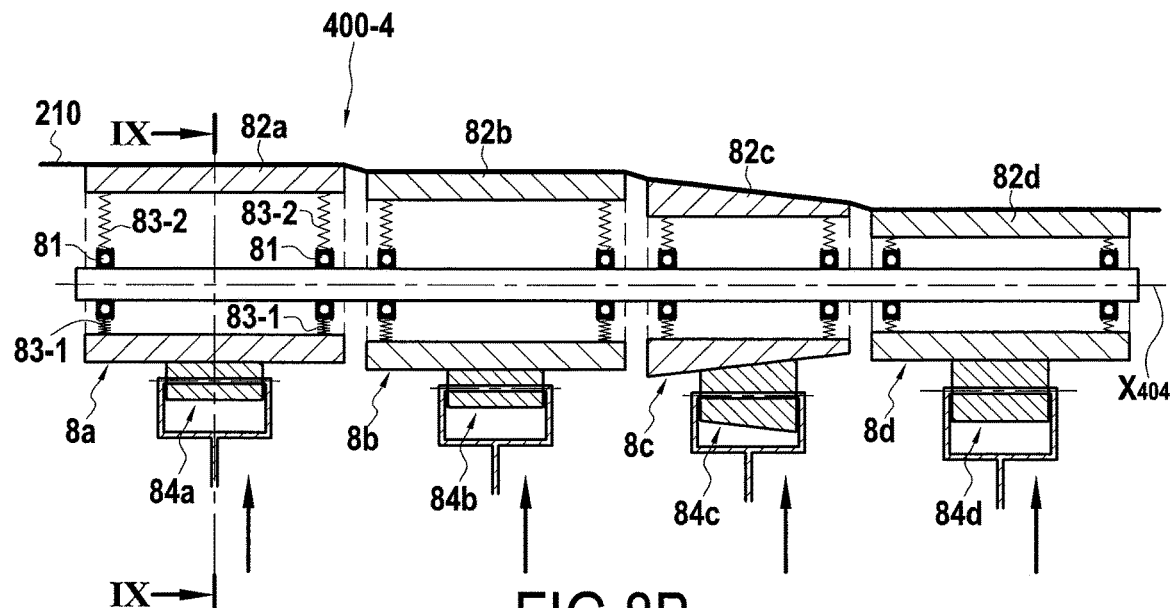

Thereafter, FIG. 8B shows a situation that requires the tension exerted by the follower roller 400-4 on the fiber texture 210 to be adapted, e.g. in order to limit any risk of the fiber texture 210 being offset while it is being wound onto the mold 600. As can be seen in this figure, some of the platens 82a, 82b, 82c are then moved radially and in independent manner relative to the stationary support shaft of axis $X_{404}$. More precisely, certain contrarotating elements 84a, 84b, 84c, 84d exert a movement force against a surface of a facing roller segment 82a, 82b, 82c, 82d. The effect of applying a force against a roller segment 8a, 8b, 8c, 8d is to compress some of the springs 83, such as the spring 83-1, and to cause other springs to be stretched, such as the spring 83-2, so as to end up moving the platen 82a, 82b, 82c, 82d of the corresponding roller segment 8a, 8b, 8c, 8d.

Figure 9A:
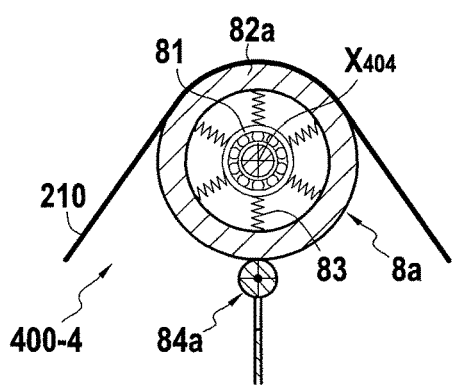
FIGS. 9A and 9B are diagrammatic axial section views of the follower roller of FIGS. 8A and 8B on plane IX.
Figure 9B:
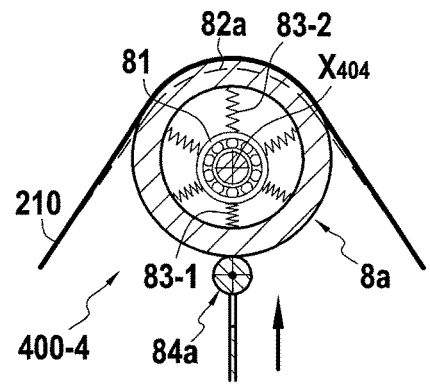

FIGS. 9A and 9B are cross-section views on plane IX of FIG. 8B relating respectively to the situation described for FIGS. 8A and 8B. In these figures, there can be seen in particular the respective state of the springs 83 in the first configuration (FIG. 9A), and also the compression and the stretching of the springs 83 (FIG. 9B).

Furthermore, dashed lines shown in FIG. 8B represent the tension initially exerted on the fiber texture 210 by the follower roller 400-4 in the situation of FIG. 8A. As can be seen in FIG. 8B, the movement of at least one roller segment between a first position, drawn in dashed lines, and a second position, drawn in continuous lines, serves to control the tension exerted by the follower roller 400-4 on the fiber texture 210.

In another embodiment that is not shown, a compressible foam is arranged between the roller segment platens forming at least one follower roller 400, 500 and a stationary support shaft. In order to guarantee that the various platens rotate, the compressible foam is then secured only to the stationary support shaft or only to the roller segment platens.

Furthermore, with reference to all of the above-described embodiments, the person skilled in the art understands that it is possible to make use of any elastically deformable element other than springs or a compressible foam.

In addition, the optional presence of a flexible membrane 220 as shown in FIGS. 3A and 3B is not restricted to the embodiment of those figures. With reference to all the above-described embodiments, it is entirely possible to cover each platen of the roller segments in a flexible membrane 220 so as to support the fiber texture 210 traveling over any of the follower rollers 400-1, 400-2, 400-3, 400-4. As described above, such a support can be particularly advantageous if the gaps between the roller segments are relatively large. The flexible membrane is then deformable so as to be capable of following the radial movements of the roller segments.

In various embodiments, each roller segment of at least one follower roller 400, 500 is associated with a sensor suitable for measuring the tension exerted on the fiber texture 210.

By way of example, in FIGS. 3A and 3B tension sensors 34a, 34b, 34c, 34d are mounted on the respective actuator systems of each of the roller segments 3a, 3b, 3c, 3d. Nevertheless, such a representation is not limiting, the sensors 34a, 34b, 34c, 34d could be associated with the roller segments 3a, 3b, 3c, 3d in any other way, e.g. being associated respectively with the platens 32a, 32b, 32c, 32d.

By way of example, each sensor 34a, 34b, 34c, 34d is connected (dashed lines in FIGS. 3A and 3B) to a servo-control system 35, such as electronic calculation means.

The servo-control system 35 is configured to respond to the tension measurements coming from the sensors to control the actuator systems of the follower roller 400, 500 made in accordance with one of the above-described embodiments.

The tension exerted on the fiber texture 210 by the follower roller 400, 500 is then controlled as a function of the value measured by each sensor 34a, 34b, 34c, 34d fitted to each roller segment 3a, 3b, 3c, 3d. By way of example, each roller segment 3a, 3b, 3c, 3d may be moved independently as a function of the value measured by its respective sensor 34a, 34b, 34c, 34d, or else as a function of a mean value and of a relationship for sharing the tension that is to be exerted on the fiber texture 210 and expressed in terms of percentage per segment.

Thus, in response to each tension measurement taken on the fiber texture 210, one or more roller segment platens of at least one follower roller might be moved in a radial direction.

Consequently, as a function of the tension measurements, it becomes possible to adapt locally the radius of one or more follower rollers across their axial widths. It is thus possible to adapt the profile in relief of the outside surface of at least one follower roller, and to control the application or the relaxing of tension on the fiber texture 210 in contact with the roller segments of the follower roller.

Such profile adaptation is used when the tension exerted on the fiber texture needs to be modified, e.g. when the difference between the initial profile defined by the outside surface of the mold and the real profile onto which the texture is being wound is such that it can lead to losses of tension in certain axial positions of the texture.

Thus, by using roller segments that enable the profile in relief of the outside surface of one or more follower rollers to be modified locally while shaping a fiber preform, the installation and the method of the invention make it possible to shape an axisymmetric fiber preform presenting in radial section a profile that varies and in which losses or non-uniformities of tension are reduced significantly. After being wound onto the injection mold or after the mold has been closed, the fiber preform that has been formed presents few defects (waves on the first winding turns, poorly applied tension giving rise to buckling and/or pinching of fibers when the mold is closed, zones of unwanted extra thicknesses, fiber volume fractions that are out of specification, creases, misalignments, etc.) compared with a preform made in accordance with the prior art in which tension unbalances are greater. This serves to reduce unwanted stops of the winding machine, as are usually necessary in order to correct defects such as creases or collapsing of portions (e.g. the flanges) of the preform, which also require the machine to be reversed together with action to be taken by one or more technicians.

The invention claimed is:

1. An installation for shaping an axisymmetric fiber preform presenting a profile that varies in radial section, the installation comprising a storage mandrel for storing a fiber texture in the form of a wound strip, one or more follower rollers, and an axisymmetric mold onto which the fiber texture is to be shaped by being wound, the one or more follower rollers being placed between the storage mandrel and the axisymmetric mold, the storage mandrel, each follower roller, and the mold presenting across their axial widths radii that vary so as to define outside surfaces having respective profiles in relief, wherein at least one follower roller comprises a plurality of roller segments, each extending over a fraction of the axial width of the follower roller, each roller segment comprising:

a platen defining a portion of the outside surface of the follower roller; and an actuator system adapted to move the platen of said roller segments, in a direction that is radial relative to the axis of the follower roller in order to modify locally the profile of the outside surface of the follower roller, wherein a flexible membrane covers each roller segment platen of said at least one follower roller and a gap present between two adjacent roller segments of said at least one follower roller.

2. The installation according to claim 1, wherein each roller segment of at least one follower roller is associated with a sensor adapted to measure the tension of the fiber texture, each sensor being connected to a servo-control system configured to respond to the tension measurements of the sensors in order to control the actuator system(s) of some or all of the roller segments.

3. The installation according to claim 1, wherein each roller segment has a distinct rotary shaft, the platen of the roller segments being secured to the rotary shaft, the actuator system being configured to move the rotary shaft of said roller segment radially.

4. The installation according to claim 1, wherein said at least one follower roller has a rotary shaft common to the roller segments, each platen of a roller segment being connected to the rotary shaft by at least one elastically deformable element, the actuator system having a plurality of contrarotating elements adapted to apply a radial movement force against each platen of a roller segment.

5. The installation according to claim 4, wherein said at least one elastically deformable element comprises springs or a compressible foam.

6. The installation according to claim 1, wherein said at least one follower roller comprises a stationary support shaft with a plurality of rolling bearings facing each platen of a roller segment each platen being connected to the rolling bearings by springs, the actuator system comprising a plurality of contrarotating elements adapted to apply a radial movement force against each platen of a roller segment.

7. A method of shaping from a fiber texture obtained by three-dimensional or multilayer weaving to form an axisymmetric fiber preform presenting a profile that varies in radial section, the fiber texture being shaped by being wound under tension onto an axisymmetric mold in order to obtain the fiber preform, the fiber texture being unwound from a storage mandrel, the fiber texture traveling over one or more follower rollers placed between the storage mandrel and the axisymmetric mold, the storage mandrel, each follower roller, and the mold presenting across their axial widths radii that vary in such a manner as to define an outside surface having a profile in relief, wherein at least one follower roller comprises a plurality of roller segments each extending over a fraction of the axial width of the follower roller, each roller segment comprising a platen defining a portion of the outside surface of said at least one follower roller, each platen being movable in a radial direction relative to the axis of said at least one follower roller, wherein a flexible membrane covers each roller segment platen of said at least one follower roller and a gap present between two adjacent roller segments of said at least one follower roller, and wherein, while winding the fiber texture onto the axisymmetric mold, the method comprises moving at least one platen of a roller segment from among the plurality of roller segments in a radial direction relative to the axis of said at least one follower roller.

8. The method according to claim 7, comprising:
   measuring a tension acting on a fiber texture being unwound from the storage mandrel and traveling over a follower roller; and
   in response to the tension measurement, causing the platen of at least one roller segment to move radially.

* * * * *